March 7, 1939. W. F. INGLEMAN 2,149,774
MACHINE FOR SHARPENING LAWN MOWERS
Filed Oct. 10, 1936 4 Sheets-Sheet 1

Inventor
W. F. Ingleman.
By Lacey & Lacey,
Attorneys

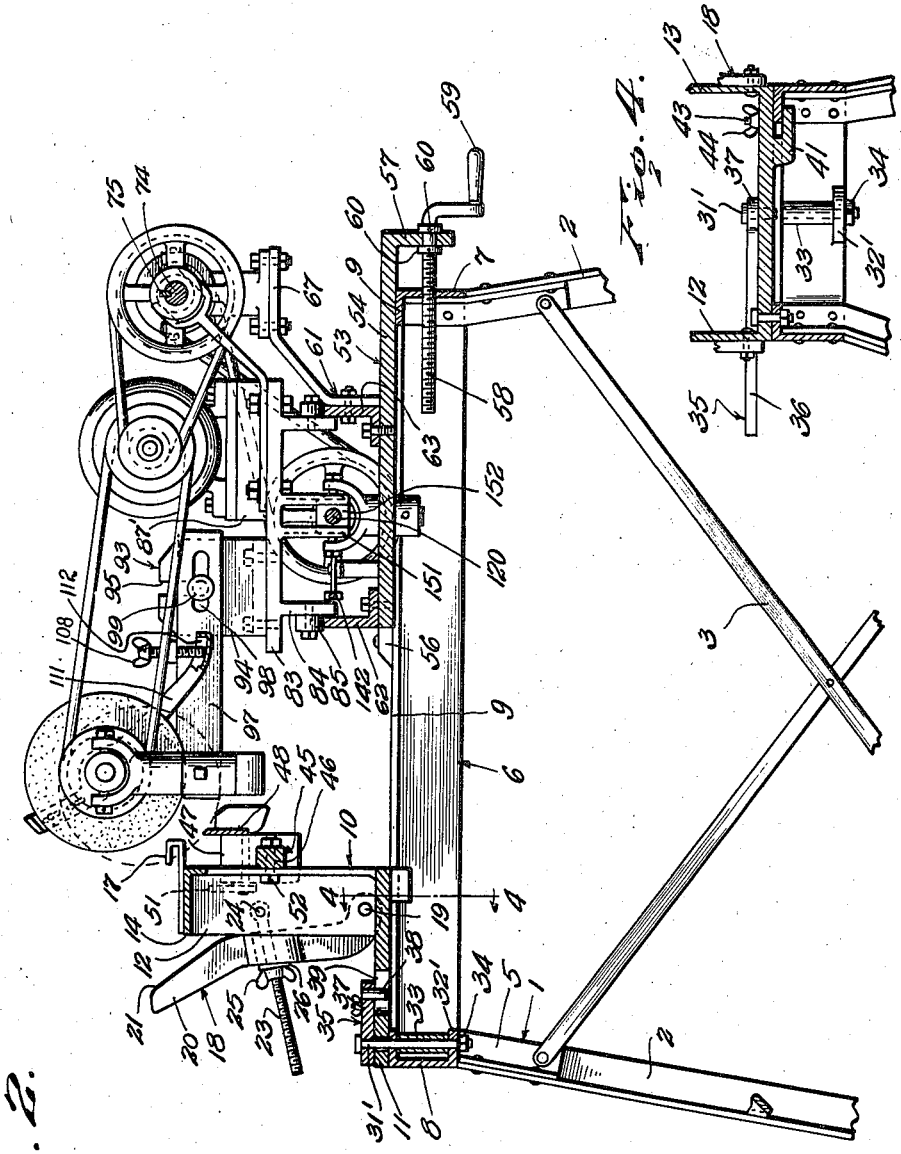

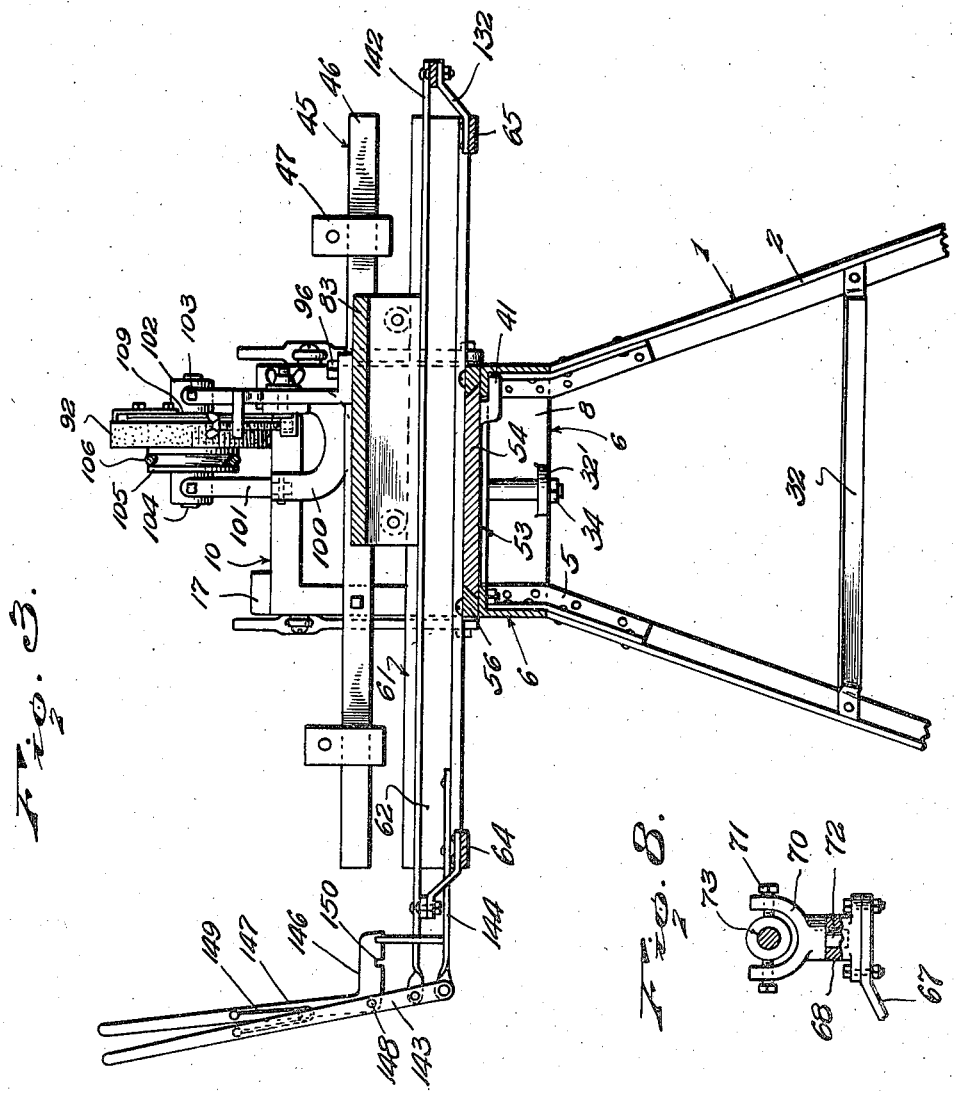

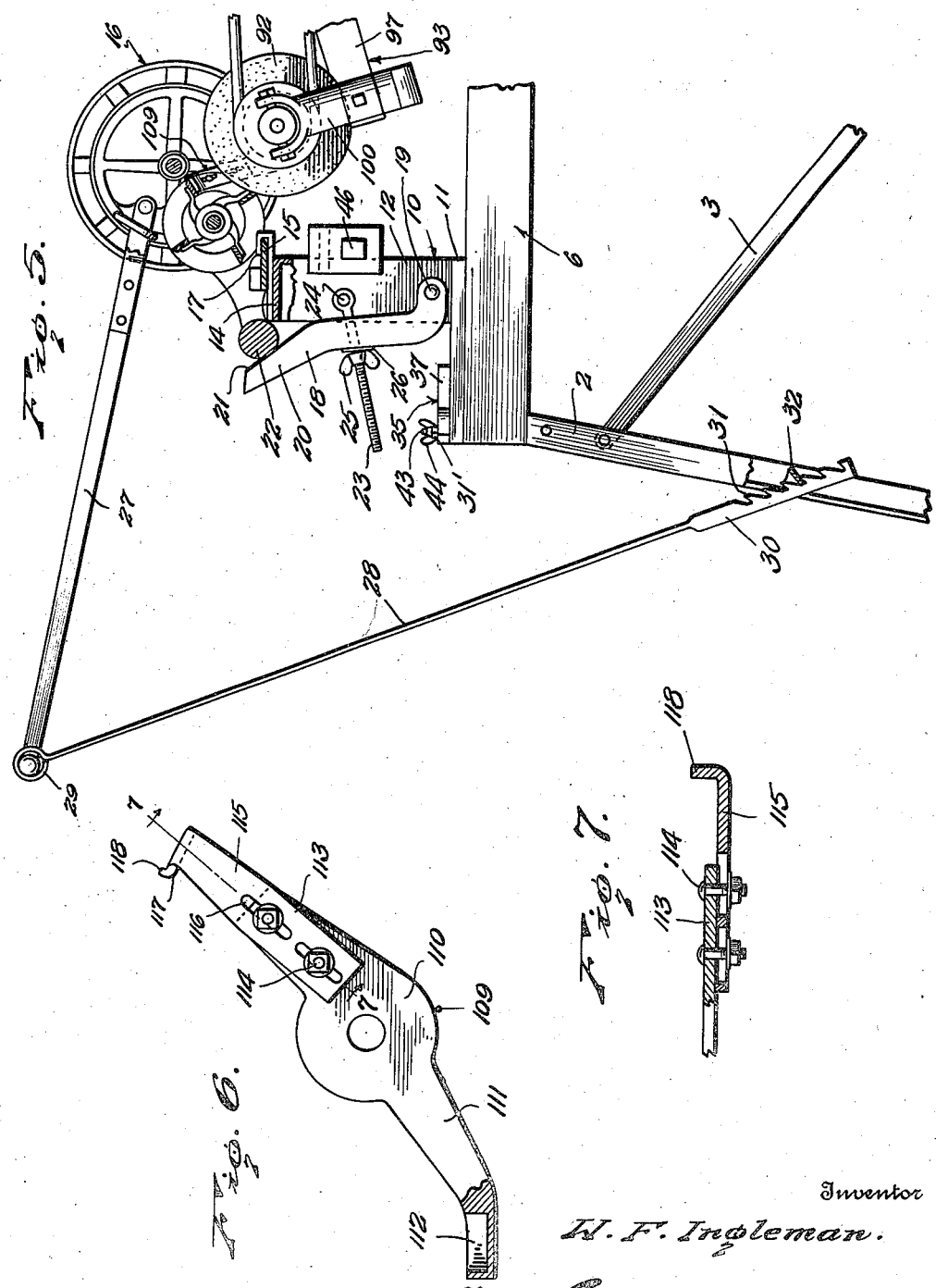

Patented Mar. 7, 1939

2,149,774

UNITED STATES PATENT OFFICE 2,149,774

MACHINE FOR SHARPENING LAWN MOWERS

William F. Ingleman, La Fayette, Ind.

Application October 10, 1936, Serial No. 105,108

4 Claims. (Cl. 51—48)

This invention relates to an improved mower sharpening machine and seeks, among other objects, to provide a device of this character which may be employed for sharpening the blades and facing cutter bars of lawn mowers.

Another object of the invention is to provide a mower sharpening machine which will grind a mower blade uniformly throughout its length, irrespective of any relatively soft and hard areas which may exist along the length of the blade.

A further object of the invention is to provide a mower sharpening machine which may be driven by electric or other power or manually, and which may be readily adjusted for varying the depth to be cut by the grinding wheel employed.

And a still further object of the invention is to provide a device of this character which may be easily assembled and which will operate satisfactorily for long periods of time without adjustment other than that necessary for an actual sharpening operation.

Other and incidental objects of the invention, not specifically mentioned in the foregoing, will render themselves apparent during the course of the following description.

In the accompanying drawings forming a part of my application:

Figure 2 is a longitudinal sectional view of the machine, the stand, or base, being partly broken away.

Figure 3 is a vertical sectional view on the line 3—3 of Figure 1, looking in the direction indicated by the arrows.

Figure 4 is an enlarged fragmentary detail sectional view on the line 4—4 of Figure 2.

Figure 5 is a fragmentary plan view showing a mower mounted for a sharpening operation.

Figure 6 is an enlarged detail plan view of the adjustable mower support employed.

Figure 7 is a fragmentary sectional view on the line 7—7 of Figure 6.

Figure 8 is a detail perspective view showing one of the shaft mountings employed.

Figure 1:
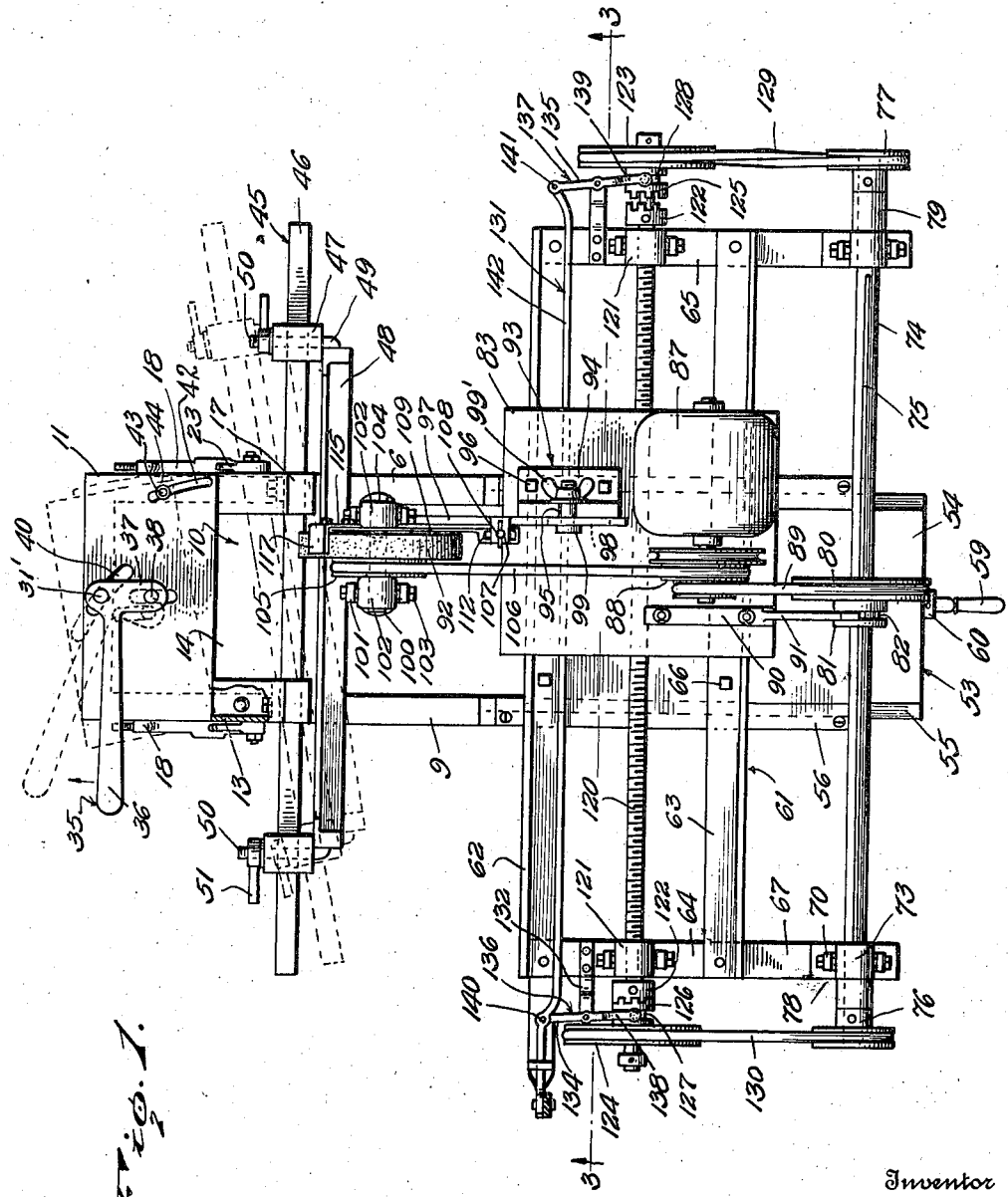
Figure 1 is a top plan view of my invention.

Referring now more particularly to the drawings, wherein like reference numerals will be seen to designate like parts throughout the several views, and particularly to Figure 2 of said drawings, the numeral 1 indicates in general a stand which is formed from lengths of angle shaped steel or other metal. The stand includes legs 2 which are effectually retained in operative position by means of diagonally disposed braces 3.

As will be observed, the legs 2 are slightly spread, or inclined, outwardly toward their lower ends. The legs 2 are secured at their upper ends to angle plates 5 which are bent obliquely outwardly medially of their lengths and are adapted to be positioned in the corners of a frame or bed 6. One of the angle plates will be secured to the inner surfaces of each corner of the frame. The frame 6 includes end walls 7 and 8, and a top overhanging flange 9. The frame is preferably formed of heavy cast metal so that a firm mounting is provided for the components carried thereby.

In order to support a mower for a cutting operation, I provide a standard 10 which includes a base plate 11 normally overlying the flange 9 of the frame 6. Rising from the base plate 11 at opposite ends thereof are side arms 12 and 13 which support a retaining plate 14. The retaining plate is adapted to receive the cutter bar 15 of a typical mower 16 for a cutting operation. Claws 17 are secured to the retaining plate 14 and are adapted to engage about the edge of the cutter bar and limit said cutter bar against vertical, longitudinal and rearward movement. Any desired number of the claws 17 may be employed, although I have shown two, one at each end of the retaining plate 14.

As best seen in Figures 2 and 5 of the drawings, I employ a pair of latches 18, one of which is hingedly connected to the side arms 12 and 13 at their lower extremities by means of a suitable stud 19. The latches are preferably formed of heavy metal, either cast or cut from a plate, and are provided with a rearwardly inclined portion 20 which is formed with a cam face 21. As will be seen, the cam face 21 is adapted to receive thereagainst the roller 22 of the mower 16. An adjusting bolt 23 is secured to each of the side arms 12 and 13 by means of a stud 24 passing through an eye formed on the bolt at its inner end. A wing nut 25 is screwed on the adjusting bolt and is adapted to engage a washer 26 which abuts the rear face of the latch 18 directly below the inclined portion 20. Tightening of the wing nut 25 will serve to urge the latch forwardly for forcing the roller 22 and the mower forwardly and thereby clamping the cutter bar 15 firmly in the claws 17 on the retaining plate 14. As will be seen, the handle 27 of the mower extends rearwardly past the rear end of the device thereabove and may be held in a desired position by means of a supporting rod 28 which is provided with an eye 29 adapted to engage about the manually engageable portion of the handle 27. The rod 28 is flattened at its lower end portion, as shown at 30, and is provided with teeth 31 which are adapted to engage selectively a bar 32 extending between a pair of rear legs 2 of the stand. It will be understood that the height of the handle may be adjusted to suit conditions.

The base plate 11 is adapted to overlie the overhanging flange 9 of the frame or bed 6, as will be understood, but said base plate is shiftably connected with the frame by means of a bolt 31' which is adapted to extend through the plate 11 and the overhanging flange 9 and an ear 32'. A spacing sleeve 33 is disposed between the flange 9 and ear 32 while a nut 34 is screwed on the lower end of the bolt 31. As best seen in Figures 2 and 4 of the drawings, the bolt 31 also shiftably connects an adjusting handle 35 with the plate 11 and, as will be seen clearly in Figure 1 of the drawings, the adjusting handle 35 is substantially T-shaped in top plan. The handle includes a shank 36 and a lever portion 37 which lever portion is provided at its free end with a depending pin 38 adapted to extend into a longitudinal slot 39 formed medially of the width of the base plate 11. The longitudinal slot is disposed near the rear end of said base plate and is relatively short in extent. As best seen in Figure 1, an arcuate slot 40 is provided in the base plate 11 near its rear end and is adapted to extend from a point medially of the rear edge of the plate 11 forwardly and obliquely. The arcuate slot is adapted to have disposed therein the bolt 31. It will be seen that by shifting the shank 36 of the handle 35 forwardly and rearwardly, the plate 11 of the standard 10 will be shifted in the manner shown in dotted lines in Figure 1, rearwardly or forwardly, for disposing the mower 16 at a desired angle obliquely with respect to the length of the frame 6. In order to permit the clamping of the plate 11 and standard 10 in a desired position, I provide an oblique slot 42 in the plate 11 near one end thereof. The slot 42 is adapted to receive therethrough a clamping bolt 43 having a wing nut 44 thereon. Tightening of said wing nut will effectually clamp the plate and standard 10 to the flange 9 of the frame 6. From the foregoing it will be seen that I have provided a standard which is readily adjustable and which is capable of effectually mounting a lawn mower for a blade sharpening operation. By reference to the numeral 41, which indicates the stop, it will also be seen that provision is made for limiting swinging movement of the standard so that proper mounting thereof will be accorded.

In order to permit the sharpening of the cutter bar 15 of the mower 16, I provide a holder for said cutter bar. The holder is indicated in general by the numeral 45 and includes a holder bar 46 which is formed of heavy metal and is preferably square in shape. The holder bar is secured to the forward end edges of the side arms 12 and 13 substantially medially of their height. The holder bar is, of course, movable with the standard 10. Surrounding the holder bar 46 near its opposite end portions are clamping sleeves 47 which are adapted to removably carry a cutter bar 48. The cutter bar 48 is adjustably connected with the sleeves 47 by means of tie rods 49 which are adapted to extend through said sleeves and are threaded at their free ends, as shown at 50. A clamping lever 51 is screwed about each of the tie rods and is adapted to engage against the rear end face of each of the clamping sleeves 47. It will be seen that the cutter bar will be effectually but removably connected with the holder bar 45. It should be understood that the tie rods 49 extend into the end portions of the cutter bar 48. The adjustable holder 45 is secured in place on the arm by means of bolts 52 and, if desired, the entire adjustable holder assembly may be removed.

As the structure employed for mounting the mower 16 for a cutting operation has been described, it is now necessary to describe the structure employed for effecting the sharpening operation. I employ a carriage 53 which is movable longitudinally of the frame or bed 6 and comprises a carriage plate 54 which is of a width slightly greater than the inside width between the inner edges of the oppositely disposed overhanging flanges 9. The opposite side edges of the carriage plate are beveled, at 55, throughout their lengths and are adapted to be clamped in position by track rails 56 which are formed with beveled faces corresponding to the beveled faces 55. It will now be understood that the carriage plate may be shifted longitudinally of the frame 6 but also limited against upward, downward or lateral movement. The track rails extend substantially one-half the length of the frame 6 and are disposed on the half of the frame opposite that occupied by the standard 10. The carriage plate is provided, at its forward end, with a depending lip 57 which is adapted to receive therethrough an adjusting screw 58 provided at its outer end with a crank 59. The adjusting screw and crank are provided, at opposite sides of the lip 57, with nuts 60 which will prevent inward and outward movement of the screw and crank with respect to the lip 57. The screw 58 is threaded through the end wall 7 of the frame. Rotation of the crank will move the screw 58 inwardly and outwardly through the wall 7 of the frame so that the carriage plate will be moved longitudinally along the track rails 56 of the carriage 53.

The carriage includes a sub-frame 61 comprising rails 62 and 63 which are connected at their opposite end portions by end plates 64 and 65. The rails 62 and 63 of the sub-frame are connected to the carriage plate 54 by bolts 66 of any suitable number. The end plates 64 and 65 are riveted or otherwise secured to the rails 62 and 63 and said end plates are bent upwardly obliquely and forwardly to extend past the end of the sub-frame 61. The forwardly extending portions of the end plates are designated at 67 and will be seen to be positioned in parallel spaced relation above the carriage plate 54. The end plates are formed of heavy metal and are of such weight and formation that the forwardly extending portions will provide a rigid support for shaft mountings 68 and 69, one of which is shown in detail in Figure 8 of the drawings. Referring to Figure 8, it will be seen that each of the shaft mountings embodies a yoke 70 which is provided with opposed set bolts 71. The yoke 70 is adapted to rotate on the shaft mounting by means of a pin and socket connection 72. Carried by the yokes 70 are bearing sleeves 73 which are held in place between the arms of the yokes by means of the set bolts 71. The bearing sleeves 73 may be adjusted in said yokes by merely shifting the position of said bolts 71.

Rotatably mounted in the bearing sleeves 73 and adapted to extend throughout the length of the sub-frame and extend slightly beyond the opposite ends thereof is a drive shaft 74 which is provided with a key 75, preferably formed integral with the shaft 74, and extending throughout the major portion of the length of said shaft. The shaft 74 is provided at its opposite end portions with pulleys 76 and 77 which are spaced from the shaft mountings by means of spacing sleeves 78 and 79. Carried on the shaft 74 and adapted to move longitudinally therealong, is a drive pulley 80. The drive pulley is keyed to rotate with the shaft 74 by means of the key 75 which is positioned in a key slot formed in the hub of the drive pulley. The drive pulley 80 is provided with an extended hub 81 which is grooved at 82 to receive a shifting fork to be described hereinafter.

Shiftable laterally on the sub-frame 61 is a rectangular platform 83 provided with integral rail flanges 84 which are provided with rollers 85 adapted to engage the upper edges of the rails of the sub-frame 61. The rollers 85 are held in place on the flanges 84 by means of bolts 86 and said rollers permit lateral movement of the platform along the major portion of the length of the sub-frame 61.

Mounted on the platform 83, at one corner thereof, being the lower right hand corner as seen in Figure 1 of the drawings, is an electric motor 87. The electric motor is preferably mounted above the platform and is spaced therefrom by upstanding flanges 87'. The electric motor is of conventional design, but, if desired, it may be dispensed with and other driving means employed in lieu thereof. In the event the electric motor is employed, suitable electrical connection will be made thereto. The electric motor 87 includes a triple pulley 88 which is of the speed reduction type. A belt 89 connects the outermost pulley surface of the pulley 88 with the drive pulley 80. A bracket 90 is carried on the platform 83 and is provided with an integral shifting fork 91 which is adapted to engage in the groove 82 for shifting the pulley simultaneously with the shifting of the platform 83. It will be seen that the belt 89 will always be in proper alinement with the outermost pulley surface of the triple pulley 88.

In order to effect a grinding operation on the cutting blades of a lawn mower, I provide a grindstone 92. The grindstone 92 is mounted on a supporting bracket which is indicated in general by the numeral 93. The supporting bracket includes an upstanding angle piece 94 which is provided with a medially disposed relatively deep notch 95. The angle plate is held in place by means of bolts 96 which pass through said angle plate and through the platform 83. A bracket supporting bar 97 is adjustably connected with the angle piece 94 and is adapted to extend rearwardly in the direction of the standard 10. The bar 97 is formed with an adjustment slot 98 at its forward end and said bar is held in place on the angle piece 94 by means of a headed bolt 99. A wing nut 99' is screwed on the bolt and is adapted to permit ready adjustment of the bracket supporting bar on the upstanding angle piece. It will be understood that the bracket supporting bar may be moved upwardly and downwardly in the notch 95 and may be shifted longitudinally on said upstanding angle piece. The bracket supporting bar is provided at its forward end with a U-shaped bracket 100 which is adjustably connected to the bracket supporting bar 97 at the rear end of said bar. Carried by the U-shaped bracket 100 in the upper end of each of the legs thereof is a bearing supporting yoke 101 adapted to support journals or bearins 102 disposed in horizontal alinement and held in position by means of opposed set screws 103 passing through the upper end portions of the arms of the yokes. The grindstone 92 is rotatably mounted in the journals 102 by means of a stub shaft 104. The grindstone 92 is further provided with a pulley 105 which is adapted to receive a belt 106 thereabout, which belt is adapted to rotatably connect the grindstone with the intermediate pulley surface of the triple pulley 88. If desired, the belt 106 may surround the innermost pulley surface of the triple pulley and the belt 89 may surround the intermediate pulley surface. In this event, however, it would be necessary to change the relative position of the pulleys 105 and 80 with respect to the pulley 88.

The bracket supporting bar 97 is provided, intermediate of its length, with a laterally extending slotted ear 107. The ear 107 is adapted to receive an adjusting screw 108 which is adapted to be threaded downwardly through the ear. Mounted on the stub shaft 104 between the grindstone 92 and the journal 102, and at the opposite side of said grindstone from the pulley 105, is a work supporting bracket 109. The bracket is shown in enlarged detail in Figure 6 of the drawings and will be seen to include a hub portion 110 and a lever portion 111 which terminates in an obliquely bent recessed pan 112. The pan 112 is adapted to receive therein the lower end portion of the adjusting screw 108. The bracket 109 also includes an upwardly extending portion 113 which is provided with bolts 114. A work supporting section 115 is provided with longitudinal adjusting slots 116. The section 115 is bent laterally at its upper end, as shown at 117, and said laterally bent portion is provided with a lip 118. As best seen in Figure 5 of the drawings, after the mower 16 is in position, and the grindstone 92 is moved into place in engagement with one of the blades of the lawn mower rotor, the laterally bent portion 117 and the lip 118 will engage the next preceding blade of the rotor and will, when the bracket 109 is rocked upwardly by the tightening of the adjusting screw 108 in the pan 112, urge the preceding blade and rotor in a counterclockwise direction so that the blade being sharpened will be forced against the grindstone for the sharpening operation.

In order to drive the grindstone laterally along a blade being sharpened, it is necessary to shift the platform in a lateral direction with respect to the length of the frame 6. To accomplish this, I provide a driving screw 120. The driving screw extends throughout the length of the sub-frame 61 and is journaled by bearings 121 which are mounted on the end plates 64 medially between the rails 62 and 63. The bearings 121 are of similar construction and are mounted in a manner similar to the bearings 73. Keyed to the opposite end portions of the driving screw 120 are clutch members 122. The opposite end portions of the driving screw 120 project beyond the clutch members 122 and are adapted to receive rotatably thereon pulleys 123 and 124. The pulleys 123 and 124 have thereon integral clutch members 125 and 126 which are provided with shifting grooves 127 and 128.

Rotatably connecting the pulley 123 with the pulley 77 is a crossed belt 129. An uncrossed or straight belt 130 rotatably connects the pulley 124 with the pulley 76. In order to engage and disengage the different clutch members, I provide shifting mechanism indicated in general at 131. The shifting mechanism 131 includes a supporting strap 132 which is secured to the end plate 64 and a supporting strap 133. The supporting strap 133 is secured to the end plate 65 in longitudinal alinement with the strap 132. The supporting straps are adapted to receive, at their corresponding outer ends, the mid-portions of shanks 134 and 135 of shifting forks 136 and 37. The shifting forks are adapted to have yokes 138 and 139 rotatably engageable in the grooves 127 and 128 of the integral clutch members 125 and 126. The corresponding outer end portions 140 and 141 are adapted to receive a shifting rod 142. The shifting rod 142 has its free end secured to the portion 141 and is secured near its opposite end portion to the portion 140 of the shifting fork 136. The shifting forks are so positioned with respect to the shifting rod that, when the shifting rod is moved for engaging the clutch member 125 with the clutch member 122, the clutch member 126 will be disengaged from its associated clutch member 122. Of course, shifting of the rod in the opposite direction will have the effect of disengaging the formerly engaged clutch members and engaging the formerly disengaged clutch members.

In order to permit easy movement of the shifting rod 142, I provide, as best seen in Figure 3 of the drawings, a shifting lever 143 which is pivotally mounted at its lower end portion in a bracket 144. The shifting rod 142 is connected to the lever 143 near the lower end thereof so that the ratio between the pivot point of the lower end of the lever and the point where the rod 142 is secured to said lever will be relatively small as compared with the distance between the connecting point of the rod 142 and the upper end portion of said lever 143. The ratio of leverage will be large and shifting of the lever accordingly made easy. Upstanding from the bracket 144 is a stop plate 145 which is adapted to be engaged by the relatively short leg 146 of a substantially L-shaped locking lever 147 which is pivotally connected with the lever 143 at 148 and is resiliently movable with respect thereto by the use of a spring 149. Spaced notches 150 are cut in the leg 146 and are adapted to be received by the stop plate 145. It will be understood that shifting of the lever will engage either the drive pulley 124 or the drive pulley 123 with the screw and, as the belts 129 and 130 are adapted to transmit relatively reverse rotation to these pulleys 123 and 124, connection of one pulley will cause the driving screw to rotate in one direction while connection of the other pulley will cause opposite rotation of said driving screw.

The platform 83 is adapted to shift longitudinally, as heretofore described, and such longitudinal shifting movement of the platform on the sub-frame 61 is permitted through the medium of depending dogs 151 which are adapted to surround a nut 152 on the screw 120. The nut 152 is confined between the dogs so that rotation of the screw 120 has the effect of causing the dogs, and thus the platform 83, to move longitudinally on the rails 62 and 63 of the sub-frame 61.

In use, after the mower has been spaced on the standard 10 in the manner previously set forth, it is only necessary to move the grindstone 92 into engagement with the blade to be sharpened. This is done by rotating the crank 59 for moving the carriage 53 rearwardly until the proper operating position for the grindstone has been reached. The motor may then be energized for transmitting rotative movement to the grindstone and, at the same time, transmit movement to the pulleys 76 and 77, the belts 129 and 130, and the pulleys 123 and 124. The lever 147 is shifted to the desired position for connecting either the pulley 124 or the pulley 123, through the clutch members, to the screw 120 for rotating the screw in either one direction or the other. As the grindstone travels across the blade being sharpened, it will be held rigidly against upward or downward movement and will, therefore, cut an even swath across the blade, irrespective of the condition of the blade, so that an absolutely true edge for said blade will be provided. By the use of the work supporting bracket 109, a uniform pressure of the blade to be sharpened upon the grindstone will be provided. It should be understood that, if desired, the electric motor may be dispensed with and manually driven means employed in lieu thereof.

The device is highly efficient in operation and durable in construction. It is believed that further description of the invention is unnecessary.

Having thus described the invention, what I claim is:

1. In a device of the class described, a frame, mower supporting means carried by the frame, a carriage carried by the frame and movable longitudinally of said frame, a sub-frame carried by the carriage and including rails, a screw carried by the sub-frame, a drive shaft carried by the sub-frame, a drive pulley keyed to rotate with said drive shaft and movable therealong, a platform carried by the sub-frame and movable laterally on said sub-frame, said platform having means depending therefrom and engageable with the screw, blade sharpening means carried by the platform, means for rotating said blade sharpening means and said drive pulley, and a bracket carried by the platform and adapted to urge the drive pulley to move along the drive shaft, said last mentioned means cooperating with the pulley and screw for moving the platform and the blade sharpening means laterally of the sub-frame as the mower blade is being sharpened.

2. In a device of the class described, a frame, mower supporting means carried by the frame for supporting a lawn mower for permitting sharpening of the blades thereof, a carriage carried by the frame, means for moving the carriage longitudinally of the frame, a sub-frame carried by the carriage, a screw carried by the sub-frame and having clutch members, pulleys carried by the screw and having clutch members selectively engageable with said first mentioned clutch members for permitting rotation of the screw either in one direction or the other, a platform carried by the sub-frame and movable laterally therealong, said platform having dogs, a nut carried on the screw and engageable by the dogs, rotation of said screw causing lateral movement in one direction or the other of said platform, means carried by the sub-frame for rotating the pulleys, a prime mover for rotating said last mentioned means, and a blade sharpening stone carried by the platform and operable by said prime mover simultaneously with the operation of the last mentioned means, said sharpening stone being adapted to engage the edge of a blade for effecting the sharpening operation and being movable thereacross in one direction or the other by said cooperating screw, platform and last mentioned means.

3. In a device of the class described, a frame, mower supporting means carried by the frame and having claws engageable with the mower cutter bar, means carried by said mower supporting means for cooperating with the claws and clamping a mower in position for a sharpening operation, a carriage carried by the frame, a sub-frame mounted on the carriage, a platform movable laterally on said sub-frame, a supporting bracket mounted on the platform and including an upstanding angle piece, a bracket supporting bar adjustably connected with said upstanding angle piece, a U-shaped bracket carried by said bracket supporting bar, a sharpening stone carried by said U-shaped bracket, a stub shaft supporting said sharpening stone, a work supporting bracket carried on said stub shaft and being adjustable for engaging a blade of the mower preceding that being sharpened whereby said blade being sharpened will be urged against the sharpening stone for effecting a sharpening operation, means carried by the platform for rotating the sharpening stone, means driven by said last mentioned means for moving said sharpening stone and platform along the sub-frame in one direction or the other, and means for moving the sharpening stone toward or away from the blade being sharpened.

4. In a device of the class described, a frame, a carriage mounted on the frame, a sub-frame mounted on the carriage, a screw carried by the sub-frame, clutch members for permitting imparting of rotative movement in either direction to said screw, supporting straps carried by the sub-frame, shifting forks carried by the supporting straps and engageable with certain of the clutch members, a shifting rod connecting said shifting forks so that certain of said clutch members will be engaged for imparting rotation in one direction to the screw while other clutch members are disengaged, a bracket carried by the sub-frame, a shifting lever carried by the bracket and engaged with the shifting rod for effecting the shifting of the clutch members, and means operable for sharpening a lawn mower blade, said last mentioned means being shiftable by rotation of the screw for traversing the blade during a sharpening operation.

WILLIAM F. INGLEMAN.